United States Patent [19]
Leibman

[11] Patent Number: 6,055,704
[45] Date of Patent: May 2, 2000

[54] CASTER WITH BUILT-IN ADJUSTMENT

[75] Inventor: Bernard Leibman, Webster, N.Y.

[73] Assignee: Xerox Corporation, Stamford, Conn.

[21] Appl. No.: 09/106,162

[22] Filed: Jun. 29, 1998

[51] Int. Cl.[7] ............................................. B60B 33/06
[52] U.S. Cl. ............................................ 16/35 R; 16/32
[58] Field of Search ................. 16/32, 35 R, 33, 16/34

[56] References Cited

U.S. PATENT DOCUMENTS

| | | | |
|---|---|---|---|
| 740,267 | 9/1903 | Gamble | 16/35 R |
| 1,017,464 | 2/1912 | Rae | 16/32 |
| 1,133,798 | 3/1915 | Hall | 16/32 |
| 1,636,325 | 7/1927 | Roe | 16/32 |
| 2,544,924 | 3/1951 | Herold | 16/35 R |
| 3,479,681 | 11/1969 | Maslow | 16/35 R |
| 3,861,306 | 1/1975 | DuBois et al. | 101/450 |
| 4,339,842 | 7/1982 | Fontana et al. | 16/32 |
| 4,360,267 | 11/1982 | Nettesheim et al. | 355/132 |
| 4,364,148 | 12/1982 | McVicker | 16/32 |
| 4,365,733 | 12/1982 | McNew | 226/109 |
| 4,648,706 | 3/1987 | Shibasaki et al. | 355/43 |
| 4,747,180 | 5/1988 | Screen | 16/35 R |
| 4,930,937 | 6/1990 | Fulton | 16/32 |
| 4,935,774 | 6/1990 | Ageishi et al. | 355/104 |
| 5,134,915 | 8/1992 | Fukano et al. | 83/563 |
| 5,375,494 | 12/1994 | Kajita et al. | 83/210 |

*Primary Examiner*—Chuck Y. Mah
*Attorney, Agent, or Firm*—Andrew D. Ryan

[57] ABSTRACT

A caster for rollably supporting a device with respect to a surface is disclosed. The caster includes a body and a rotatable member operably connected to the body. The member is rollably cooperable with the surface. The caster further includes a connector operably connected to the body for connecting the body to the device and a support operably connected to the connector.

6 Claims, 4 Drawing Sheets

CASTER WITH BUILT-IN ADJUSTMENT

The present invention relates to an apparatus for printing machines. More specifically, the invention relates to a caster for a printing machine.

The features of the present invention are useful for any machine which requires occasional relocation, for example, printing machines such as electrophotographic printing machines.

In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a marking material such as toner particles is transported into contact with the electrostatic latent image in a region known as the development zone. Toner particles are attracted from the magnetic roller to the latent image. The resultant toner powder image is then transferred from the photoconductive surface to a copy sheet and permanently affixed thereto. The foregoing generally describes a typical mono-color single component development electrophotographic copying machine.

Freestanding machines may require occasional relocation. This is particularly true for office-type equipment where relocations occur frequently. Medium size printing machines may be easily relocated when provided with casters for rolling the machines to different locations.

To provide for controllable rolling of a machine with casters, a typical machine includes four casters spaced at opposite corners of a rectangular machine. Two adjacent casters are fixed casters while two are permitted to pivot to provide for a steerable relocation of the machine. Two fixed and two pivoting casters are thus required, therefore, two separate types of casters must be stored and manufacturing equipment for the different types of casters must be provided.

Once in location, the machine must be secured in place. Further, the machine may frequently be adjusted to a level position for proper operation of the machine. The machine thus often includes adjustment screws which are used to lift the caster from the floor and to mount the machine on the feet. These adjustment feet are adjustable to level the machine.

Where accurate adjustment for leveling is not required, the casters must, at the least, be locked so that rotation of the machine does not occur once the machine is in its proper position. Expensive and complicated brakes are often added to the casters to prevent the rotation of the caster after relocation.

The following disclosures may be relevant to various aspects of the present invention:

U.S. Pat. No. 3,861,306

Patentee: DeBois, et al.

Issue Date: Jan. 21, 1975

U.S. Pat. No. 4,360,267

Patentee: Nettesheim, et al.

Issue Date: Nov. 23, 1982

U.S. Pat. No. 4,365,733

Patentee: NcNew

Issue Date: Dec. 28, 1982

U.S. Pat. No. 4,648,706

Patentee: Shibasaki, et al.

Issue Date: Mar. 10, 1987

U.S. Pat. No. 4,935,774

Patentee: Ageishi, et al.

Issue Date: Jun. 19, 1990

U.S. Pat. No. 5,134,915

Patentee: Fukano, et al.

Issue Date: Aug. 4, 1992

U.S. Pat. No. 5,375,494

Patentee: Kajita, et al.

Issue Date: Dec. 27, 1994

U.S. Pat. No. 3,861,306 discloses a combined electrostatic-lithographic duplicating process and apparatus in which an electrostatic master copy of an original document is made in a xerographic copying unit and the master copy is subsequently converted to a lithographic master from which ink copies are made in a lithograph press. The process is carried out as a continuous operation from the making of the electrostatic master copy through the making of the lithographic ink copies in a series of interrelated steps. Also disclosed is a preferred embodiment of an apparatus for carrying out the above process in which the various instrumentalities for performing the specific steps of the process are so interrelated and arranged that the entire process is carried out by the apparatus disclosed in a continuous operation. The various instrumentalities are modular in construction to facilitate shipping, service and replacement of components.

U.S. Pat. No. 4,360,267 discloses a method and apparatus for producing printing patterns through the use of a liquid photosensitive resin system. A partially cured resin backing member is applied to a vertical supporting surface and a glass cover plate having a photographic negative mounted on the glass surface is positioned in spaced relation to the backing member. A liquid uncured photosensitive resin is introduced into the space between the backing member and the photographic negative, and an ultra-violet lighting unit is then positioned adjacent the glass cover plate to expose portions of the resin to the light through the photographic negative, causing the exposed portions of the resin to cure or crosslink. The lighting unit is oscillated to provide tapered edges on the exposed crosslinked areas of the resin. Following the crosslinking, the pattern can be removed and the uncured portions of the resin can be washed from the pattern.

U.S. Pat. No. 4,365,733 discloses a system for passing long fan-folded documents and corresponding copy paper through a reproducing apparatus either concurrently or independently of each other, and including a collapsible, upright stand which carries a pair of paper roll supporting elements, a pair of paper guide plates pivotally and detachably connected to the top of the stand, and a guide bar for guiding paper from a roll on the stand to the guide plates. The system further includes a feed tray detachably mounted on a reproducing apparatus and having a partition plate selectively positionable in the feed tray to facilitate containment in the tray of a fan-folded document to be reproduced. The feed tray includes a bottom plate having downwardly projecting ribs to detachably mount the tray on the reproducing machine, and upwardly projecting ribs spaced from a paper discharge slot at the front side of the tray, and acting as an indexing abutment for contacting and positioning the fan-folded document in the tray.

U.S. Pat. No. 4,648,706 discloses an image reproduction apparatus which can make a copy of images written or drawn on a board as well as a copy of images of an original provided on an original table. The image reproduction apparatus comprises a board portion and a copying portion. The optical information of images written or drawn on a board is supplied to the copying section through an optical system. The copying section moves between a position where the image reproduction is performed by the above optical information and a position where an ordinary copying of the original is performed. Thus, according to the present invention, the copying section moves between said two positions.

U.S. Pat. No. 4,935,774 discloses a method and an apparatus by use of three-dimensional photo-lithographic exposure employed for transferring an image to a recording medium among a series of processing works of practicing groove-processing, etc., corresponding to the image by utilization of photo-etching technology or the like, the apparatus for performing three-dimensional exposure comprising an optical unit, a work gripping assembly, a work moving mechanism, a control unit, and a main body frame, and the optical unit comprising a light source portion, a lens portion, and a reflection mirror, wherein the ultraviolet rays focused by the reflection mirror through a slit of a photo-mask onto a photo-sensitive coating film formed on an outer surface of a work loosely inserted into the through-hole of the reflection mirror together with a photo-mask surrounding an outer circumference of the work.

U.S. Pat. No. 5,134,915 discloses a rolled-paper feed unit for an image forming apparatus. The unit includes a movable body for reeling out and feeding rolled paper and for cutting the rolled paper into a cut sheet having a predetermined length and a stationary frame which holds the movable body vertically moved from an upper position where the rolled paper is fed to a lowered retreat position where the operator is adapted to carry out certain operations. When feeding the rolled paper to the image forming apparatus main body, the movable body is held at the upper position. When resupplying cut paper to a cassette mounted on the image forming apparatus, or executing a jam processing or the like, the movable body is lowered.

U.S. Pat. No. 5,375,494 discloses a roll paper cutting device is attachable to the main body of an image forming apparatus main body. The roll paper cutting device includes a cutter for cutting the paper of a roll of paper contained therein, as well as an arrangement for feeding the cut sheet to the image forming apparatus. The roll paper cutting device has at least one transport roller for transporting the roll paper, as well as a drive system for driving the transport roller, and a drive change device such as a clutch for selectively bringing the transport roller into idle rotation or into a driven state. A detector detects the travel of the roll paper. A control device such as a CPU controls the rotation of the transport rollers with predetermined timing based on the time when the travel of the roll paper is detected with all the transport rollers in idle rotation in a standby state for paper feeding.

In accordance with one aspect of the present invention, there is provided a caster for rollably supporting a device with respect to a surface. The caster includes a body and a rotatable member operably connected to the body. The member is rollably cooperable with the surface. The caster further includes a connector operably connected to the body for connecting the body to the device, and a support operably connected to the connector.

In accordance with another aspect of the present invention, there is provided a caster for supporting a printing machine with respect to a surface. The caster includes a molded plastic body defining a first opening therethrough. The body defines a first axis thereof. The body further defines a second opening therethrough. The first axis is perpendicular to the second opening. The body further defines a third opening parallel to the second opening and spaced therefrom. The caster also includes a pin fittable at least partially within the third opening. A distal portion of the pin is engagable with the printing machine to prevent the rotation of the body about the first axis. The caster also includes an axle slidably fitted to the first opening of the body and rotatable about the first axis. The caster also includes a first wheel connected to a first end of the axle and a second wheel connected to a second end of the axle. At least one of the first wheel and the second wheel rollably cooperable with the surface. The caster also includes a connector slidably fitted to the second opening of the body. The connector includes a first portion of a periphery thereof having first external threads thereon and a second portion of a periphery thereof having second external threads thereon. The first external threads are operably connectable to the printing machine for connection thereto. The caster also includes a support operably connected to the second external threads. A distal end of the support is adjustable to a position beyond at least one of the first wheel and the second wheel so that the support may separate at least one of the first wheel and the second wheel from the surface.

In accordance with yet another aspect of the present invention, there is provided an electrophotographic printing machine of the type having a caster for rollably supporting a device with respect to a surface. The caster includes a body and a rotatable member operably connected to the body. The member is rollably cooperable with the surface. The caster further includes a connector operably connected to the body for connecting the body to the device, and a support operably connected to the connector.

The invention will be described in detail herein with reference to the following figures in which like reference numerals denote like elements and wherein.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 4:
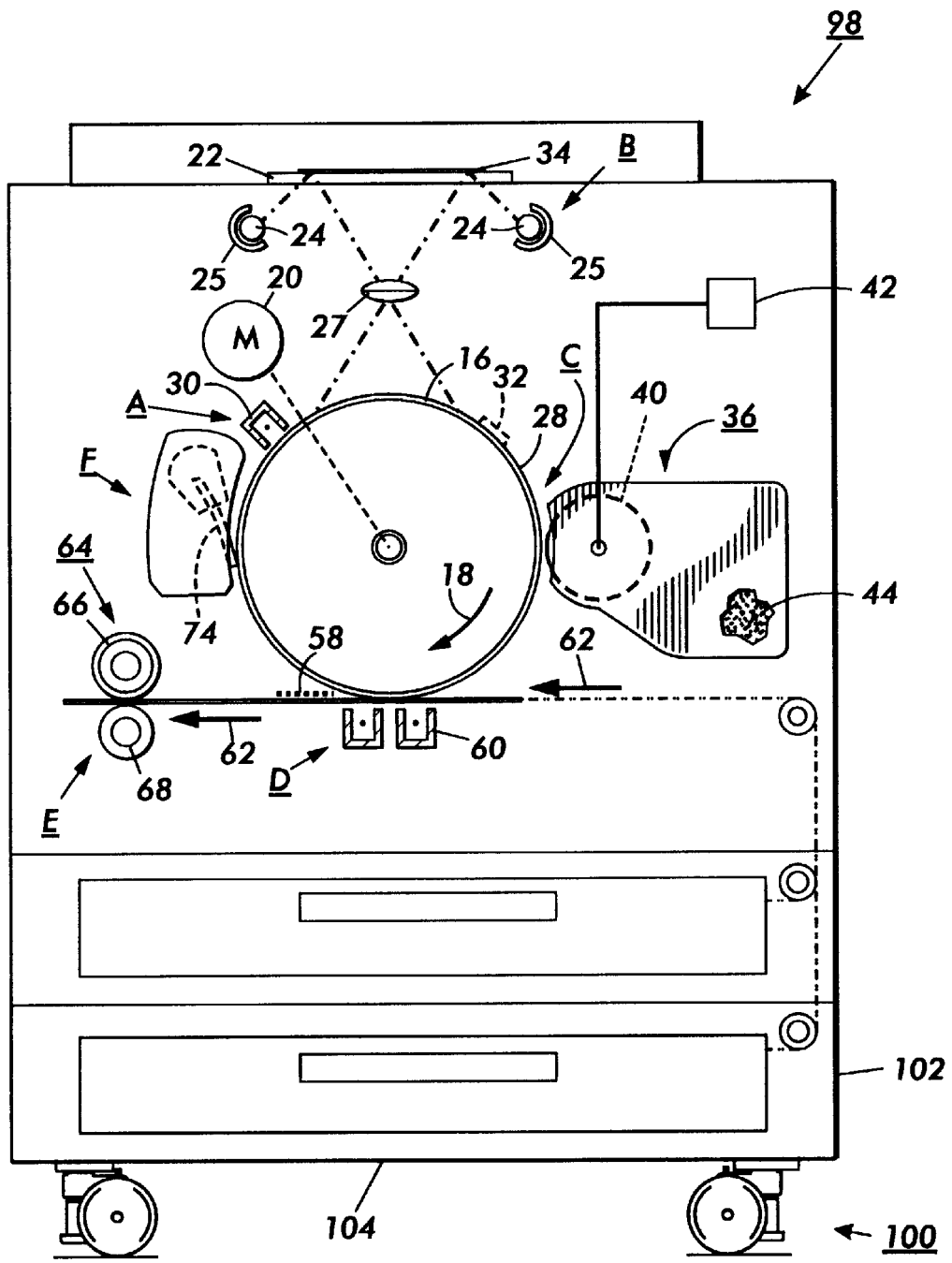
FIG. 4 is a schematic elevational view of an electrophotographic printing machine incorporating the FIG. 1 caster therein.

For a general understanding of the illustrative electrophotographic printing machine incorporating the features of the present invention therein, reference is made to the drawings. In the drawings, like reference numerals have been used throughout to designate identical elements. FIG. 4 schematically depicts the various components of an electrophotographic printing machine incorporating the caster of the present invention therein. Although the caster of the present invention is particularly well adapted for use in the illustrative printing machine, it will become evident that the caster is equally well suited for use in a wide variety of printing machines and are not necessarily limited in its application to the particular embodiment shown herein.

Referring now to FIG. 4, the electrophotographic printing machine shown employs a photoconductive drum 16, although photoreceptors in the form of a belt are also known, and may be substituted therefor. The drum 16 has a photoconductive surface deposited on a conductive substrate. Drum 16 moves in the direction of arrow 18 to advance successive portions thereof sequentially through the various processing stations disposed about the path of movement thereof. Motor 20 rotates drum 16 to advance drum 16 in the direction of arrow 18. Drum 16 is coupled to motor 20 by suitable means such as a drive.

Initially successive portions of drum 16 pass through charging station A. At charging station A, a corona generating device, indicated generally by the reference numeral 30, charges the drum 16 to a selectively high uniform electrical potential, preferably negative. Any suitable control, well known in the art, may be employed for controlling the corona generating device 30.

A document 34 to be reproduced is placed on a platen 22, located at imaging station B, where it is illuminated in known manner by a light source such as a tungsten halogen lamp 24. The document thus exposed is imaged onto the drum 16 by a system of mirrors 25 and lens 27, as shown. The optical image selectively discharges the surface 28 of the drum 16 in an image configuration whereby an electrostatic latent image 32 of the original document is recorded on the drum 16 at the imaging station B.

It should be appreciated that the printing machine may be a digital printing machine. In a digital printing machine a ROS (Remote Optical Scanner) may lay out the image in a series of horizontal scan lines with each line having a specific number of pixels per inch. The ROS may include a laser(not shown) having a rotating polygon mirror block associated therewith. The ROS exposes the photoconductive surface of the printer.

At development station C, a magnetic development system or unit, indicated generally by the reference numeral 36 advances developer materials into contact with the electrostatic latent images. Preferably, the magnetic developer unit includes a magnetic developer roller mounted in a housing. Thus, developer unit 36 contains a magnetic roller 40. The roller 40 advances toner particles into contact with the latent image. Appropriate developer biasing is may be accomplished via power supply 42, electrically connected to developer unit 36.

The developer unit 36 develops the charged image areas of the photoconductive surface. This developer unit contains magnetic black toner, for example, particles 44 which are charged by the electrostatic field existing between the photoconductive surface and the electrically biased developer roll in the developer unit. Power supply 42 electrically biases the magnetic roll 40.

A sheet of support material 58 is moved into contact with the toner image at transfer station D. The sheet of support material is advanced to transfer station D by a suitable sheet feeding apparatus, not shown. Preferably, the sheet feeding apparatus includes a feed roll contacting the uppermost sheet of a stack copy sheets. Feed rolls rotate so as to advance the uppermost sheet from the stack into a chute which directs the advancing sheet of support material into contact with the photoconductive surface of drum 16 in a timed sequence so that the toner powder image developed thereon contacts the advancing sheet of support material at transfer station D.

Transfer station D includes a corona generating device 60 which sprays ions of a suitable polarity onto the backside of sheet 58. This attracts the toner powder image from the drum 16 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a pressure roller 68. Sheet 58 passes between fuser roller 66 and pressure roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the operator. It will also be understood that other post-fusing operations can be included, for example, stapling, binding, inverting and returning the sheet for duplexing and the like.

After the sheet of support material is separated from the photoconductive surface of drum 16, the residual toner particles carried by image and the non-image areas on the photoconductive surface are charged to a suitable polarity and level by a preclean charging device (not shown) to enable removal therefrom. These particles are removed at cleaning station F. The cleaner unit is disposed at the cleaner station F. The cleaner unit may include a blade 74 that tends to scrape the residual toner particles from the drum 16 and then deposit them into a waste container. Subsequent to cleaning, a discharge lamp or corona generating device (not shown) dissipates any residual electrostatic charge remaining prior to the charging thereof for the next successive imaging cycle.

It is believed that the foregoing description is sufficient for purposes of the present application to illustrate the general operation of an electrophotographic printing machine incorporating the development apparatus of the present invention therein.

According to the present invention and referring again to FIG. 4, a caster 100 with built-in adjustment according to the present invention is shown mounted on device or printer 98. The casters 100 are secured to frame 102 with the caster 100 being secured to bottom 104 of the frame 102.

Figure 1:
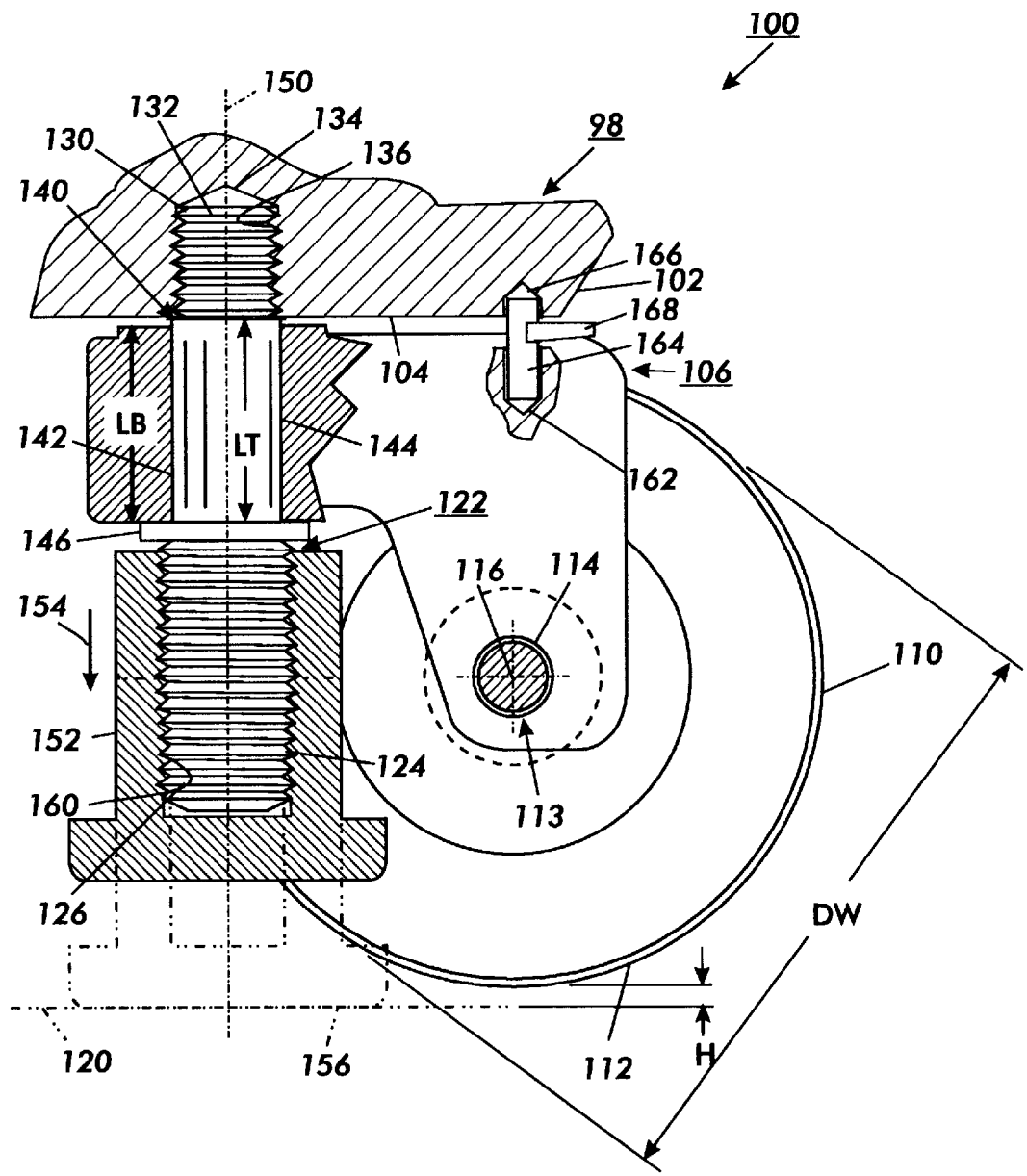
FIG. 1 is a plan view of a caster according to the present invention.

Referring now to FIG. 1, the caster 100 is shown in greater detail. The caster 100 includes a body 106 to which a rotating member 110 is rotatably secured thereto. The rotating member 110 is preferably in the form of a wheel, including a cylindrical outer periphery 112.

The body 106 may be made of any suitable durable material, for example, a metal or a plastic. For example, the body 106 may be made of an acetal resin, for example Delrin®, a trademark of duPont (UK) Ltd. or be made of a polyamide, for example nylon.

The wheel 110 may be secured to the body 106 in any suitable fashion. For example, the body 106 may include a first opening 113 to which an axle 114 may be rotatably fitted. The axle 114 is connected to rotating member 110. The rotating member 110 is permitted to rotate relative to the body 106 about first axis 116. Preferably, the axle 114 is fixedly secured to the rotating member 110 and the axle 114 is rotatably secured to the body 106. It should be appreciated however, that the axle 114 may be rotatably secured to any combination of the body 106 and the rotating member 110.

The axle 114 may be made of any suitable durable material, for example, a plastic or a metal. For example, the axle 114 may be made of DelrinÒ, a product of duPont U.K. Ltd., or be made of a metal. For example, the axle 114 may be made of cold rolled steel.

The rotating member 110 may be made of any suitable durable material, for example a plastic or a metal. For example, the rotating member 110 may be made of a plastic, for example DelrinÒ or nylon.

The wheel 110 serves to support the device 98 and the periphery 112 of the wheel 110 is in rolling contact with floor surface 120 such that device 98 may be rolled from a first location to a second location.

The caster 100 further includes a connector 122 for connecting the body 106 to the device 98. The connector 122 is operably connected to the body 106. The connector 122 has any suitable shape capable of securing the body 106 of the caster 100 to the frame 102 of the device 98.

For example, as shown in FIG. 1, the connector 122 is in the form of a pin or stud including a first portion 124 including first external threads 126 as well as a second portion 130 including second external threads 132. The second portion 130 of the connector 122 is used to secure the caster 100 to the device 98. Preferably, the frame 102 of the device 98 includes a cavity 134 including internal threads 136 which are mateable with the external threads 132 of the second portion 130 of the connector 122. It should be appreciated that the connector 122 may be secured to the frame 102 in any suitable fashion. For example, the connector 122 may be press fit or shrunk fit onto the device 98 or the connector 122 may be welded, glued, or similarly secured to the frame 102 of the device 98.

The connector 122 may be connected to the body 106 in any suitable fashion. For example, the connector 122 may be shrunk fit, press fit, glued or welded to the body 106. Preferably, however, the connector 122 is rotatably fitted to the body 106. To permit the rotatable mounting of the body 106 to the connector 122, preferably, the body 106 includes a second opening 140. The connector 122 is thus rotatably fitted within the second opening 140 of the body 106.

For example, the connector 122 may further include a third portion 142 which includes a cylindrical outer periphery 144 which mates with second opening 140. The third portion 142 further includes a ring 146 located on the lower portion of the third portion 142 and serves to secure the body 106 between the bottom 104 of the frame 102 of the device 98 and the ring 146 of the connector 122. To permit the rotation of the caster 100 about the frame 102 of the device 98, preferably, the second opening 140 includes a second axis or center line 150 which is perpendicular to first axis 116 of the first opening 113 of body 106. Therefore, as the body 106 rotates about second axis 150, the wheel 110 maintains its height position relative to surface 104 of frame 102.

To assist in permitting the caster 100 to rotate about the frame 102 of the device 98, preferably, the connector 122 has a third portion length LT which is greater than the length LB of the body 106 adjacent the opening 140, thereby the body 106 may freely spin about the connector 122 permitting the caster 100 to swivel.

The connector 122 may be made of any suitable durable material, for example, a plastic or a metal. For example, the connector 122 may be made of DelrinÒ, a product of duPont U.K. Ltd., or be made of a metal. For example, the connector 122 may be made of cold rolled steel.

The caster 100 may further include a leveling support 152 for use in leveling the device 98 and to prevent the further movement of the device 98 when the device 98 has arrived at its final position. The leveling support 152 may have any suitable configuration but preferably, as shown in FIG. 1, the support 152 is operably connected to the connector 122. The support 152 is adjustable downward in the direction of arrow 154 from a first position 155 as shown to a second position 156 as shown in phantom where the periphery 112 of the wheel 110 is spaced from surface 120, a distance H of, for example, 0 to 0.50 inches.

The leveling support 152 may be adjustably connected to the connector 122 in any suitable fashion, such as by a set of pins or ratchets, but preferably the leveling support 152 includes internal threads 160 which mate with the first external threads 126 of the connector 122.

The support 152 may be made of any suitable durable material, for example, a metal or a plastic. For example, the support 152 may be made of an acetal resin, for example DelrinÒ, a trademark of duPont (UK) Ltd. or be made of a polyamide, for example nylon.

To provide for controlled movement of the device 98, preferably, the device 98 includes four equally spaced-apart casters 100 with two adjacent casters each having a pivoting caster while the other two casters have a nonpivoting arrangement. To accommodate a nonpivoting caster, preferably, the body 106 may be selectively fixedly and rotatably secured to the frame 102 of device 98 in any suitable fashion. For example, the body 106 may include a third opening 162 to which a pin 164 may be matingly fitted. The pin 164 may likewise be matingly fitted to opening 166 in the frame 102. A lever 168 may be located on the pin 164 to selectively engage and disengage the pin 164.

The pin 164 may be made of any suitable durable material, for example, metal or a plastic. For example, the pin 164 may be a commercially available metal roll pin with a diameter of, for example, 0.12 inches.

Figure 2:
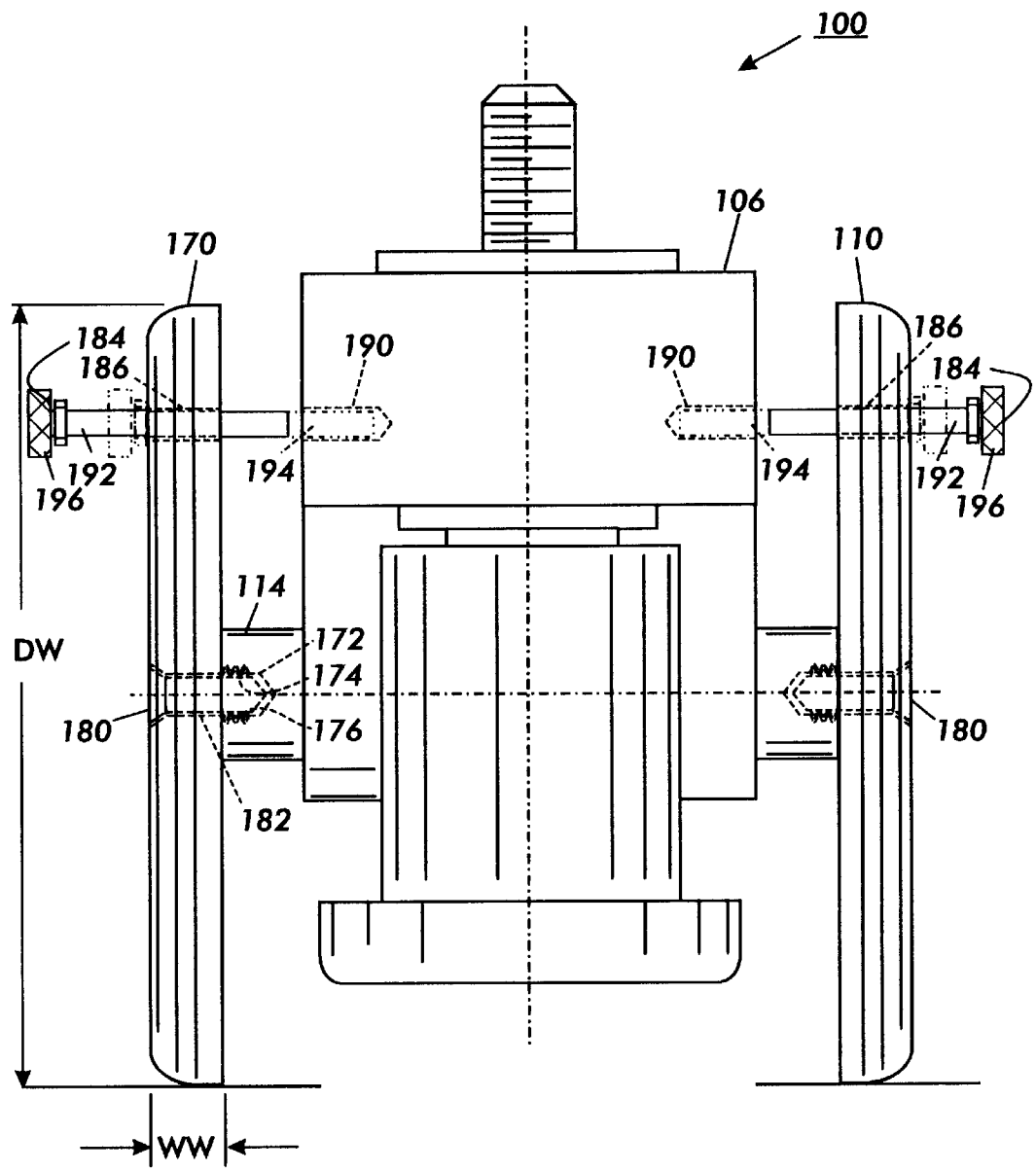
FIG. 2 is an end view of the caster of the FIG. 1.

Referring now to FIG. 2, the caster 100 is shown in greater detail. As shown in FIG. 2, preferably, the caster 100 includes a second wheel 170 spaced from and similar to first wheel 110. The body 106 is positioned between the first wheel 110 and the second wheel 170. The first wheel 110 and second wheel 170 may be secured to the body 106 in any suitable fashion. For example, the axle 114 may extend from first wheel 110 to second wheel 170.

The axle 114 may be secured to the wheels 110 and 170 in any suitable fashion. For example, the wheels 110 and 170 may be welded, glued, or attached by fasteners. For example, as shown in FIG. 2, the axle 114 includes openings 172 with internal threads 174 which mate with external threads 176 on screws 180. The screws 180 may be any commercially available metal or plastic screw. The external threads 176 of the screws 180 are matingly fitted to the internal threads 174 of the openings 182 on the first wheel 110 and the second wheel 170.

To prevent the rotation of the caster 100 when the device 98 is in its final position, the caster 110 may include a wheel lock for selectively locking the wheels 110 and 170. The wheel lock may have any suitable shape or configuration and, for example, may be in the form of locking pins 184 which are removably engagable with locking pin openings 186 and 190, respectively, in the wheels 110 and 170 and in the body 106. The pins 184 may be positioned in a first outboard and unlocked position 192 as shown when the wheels 110 and 170 are to be rotated and to a second inboard and locked position 194 as shown in phantom when the wheels are to be locked.

The pins 184 may be made of any suitable durable material, for example, metal or a plastic. For example, the pins 164 may be commercially available metal roll pins with a diameter of, for example, 0.12 inches.

The caster 100 may be of suitable size and strength to support the weight of the device 98. For example, for a midsize copier, if the wheels 110 and 170 are made of Delrin Ò, the wheels 110 and 170 may have a diameter DW of approximately 1.625 inches and width WW of approximately 0.36 inches.

The pins 184 if made of a metal roll pin may have a diameter of approximately 0.12 inches and may optionally include a head 196 to assist in the engagement hereof.

The connector 122 and leveling support 152 may have any suitable size and shape to be made of suitable materials capable of supporting the weight of the device 98. For example, when the device 98 is a midvolume electrostatic copier, and when the connector 122 made of cold rolled steel, the connector may include a third portion 142 having a diameter of approximately 0.43 inches and a second portion 130 including threads of, for example, $5/16-20$ and a first portion 124 having first external threads of, for example, $5/16-20$ inches.

Figure 3:
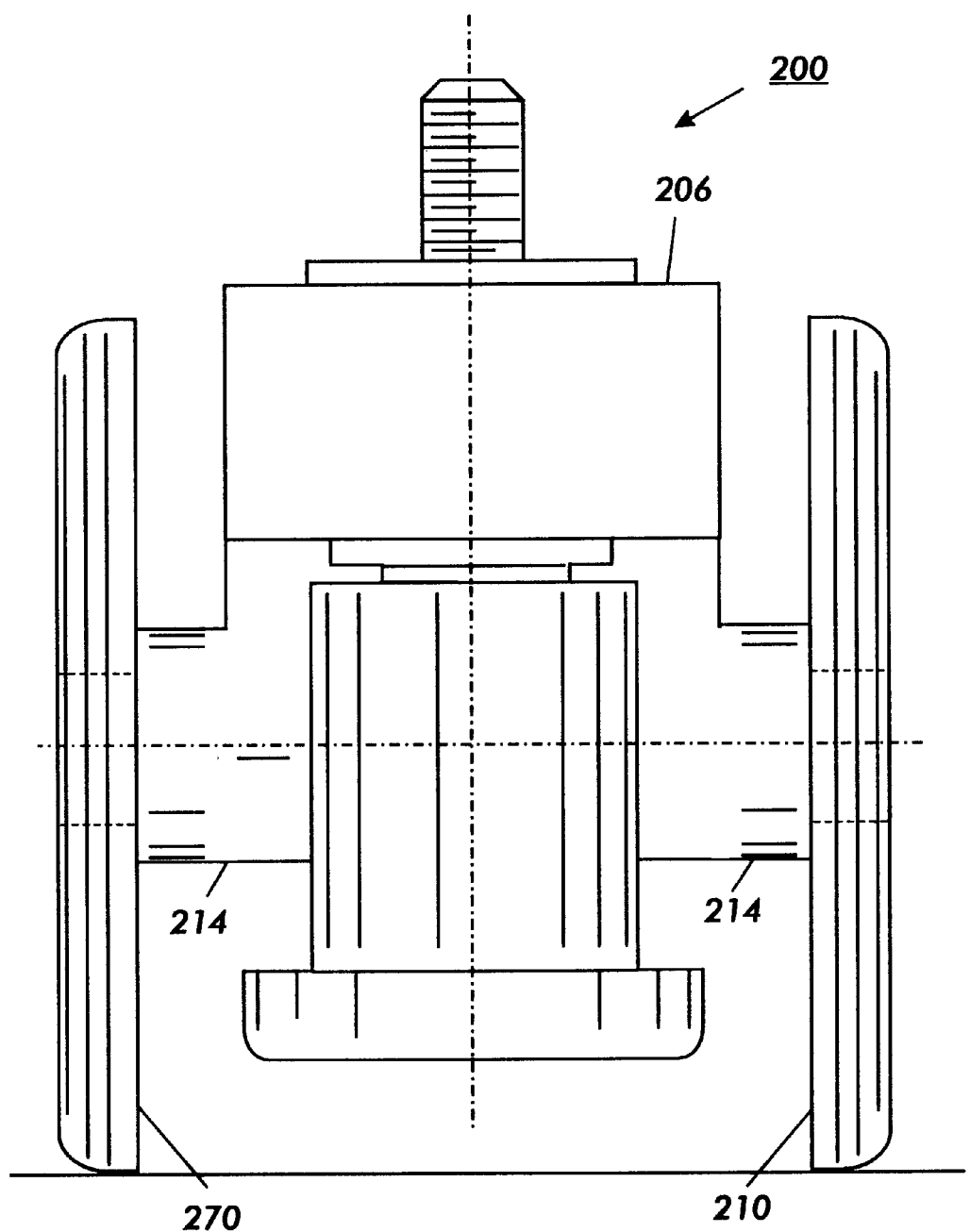
FIG. 3 is an end view of an alternate embodiment of a caster according to the present invention.

As shown in FIG. 3, the caster 200 with built-in adjustment according to the present invention is shown. Caster 200 is similar to caster 100 except that body 206 includes an integral axle 214 which is otherwise somewhat similar to axle 114. The axle 214 may be secured to wheels 270 and 210, similar to wheels 170 and 110, in any suitable fashion, for example, by interference fit or by fasteners (not shown).

By providing a caster in which at least one of the components is made of a molded plastic material, an inexpensive caster may be provided.

By providing a caster including a body which is rotatably secured to the mounting stud, a caster is provided which may spin making movement of the device simple.

By providing a caster including a leveling support which is threadably attached to the support pin, an inexpensive leveling support may be provided.

By providing a caster including a removable pivoting pin, a caster may be provided which may serve as a pivoting or a fixed caster.

By providing a caster including wheel lock pins, a caster may be provided which has a simple, inexpensive wheel lock.

By providing a caster which includes a body having an integral axle, a simple, inexpensive caster may be provided which does not require a separate axle.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A caster for supporting a printing machine with respect to a surface, said caster comprising:

a molded plastic body defining a first opening therethrough defining a first axis thereof, said body defining a second opening therethrough, the first axis being perpendicular to the second opening; said body defining a third opening parallel to the second opening and spaced therefrom;

a pin fittable at least partially within the third opening, a distal portion of said pin engagable with the printing machine to prevent the rotation of the body about said first axis;

an axle slidably fitted to the first opening of said body and rotatable about said first axis;

a first wheel connected to a first end of said axle;

a second wheel connected to a second end of said axle, at least one of said first wheel and said second wheel rollably cooperable with the surface;

a connector slidably fitted to the second opening of said body, said connector including a first portion of a periphery thereof having first external threads thereon and including a second portion of a periphery thereof having second external threads thereon, said first external threads operably connectable to said printing machine for connection thereto; and a support operably connected to said second external threads, a distal end of said support adjustable to a position beyond at least one of said first wheel and said second wheel so that the support may separate at least one of said first wheel and said second wheel from the surface.

2. A caster according to claim 1 wherein the caster is adapted to rotate about an axis of a printing machine.

3. A caster according to claim 1 wherein the support is threadably positionable with respect to the connector.

4. A caster according to claim 1 wherein the support is adapted to adjustably support a printing machine.

5. A caster according to claim 1 wherein at least one of the first wheel, the second wheel, the connector, and the support comprises a plastic.

6. A caster according to claim 1 wherein at least one of the body, the first wheel, the second wheel, the connector, and the support comprises a metal.

* * * * *